(12) United States Patent
Matsumoto et al.

(10) Patent No.: US 12,180,320 B2
(45) Date of Patent: Dec. 31, 2024

(54) ULTRAVIOLET CURABLE SILICONE COMPOSITION AND CURED PRODUCT THEREOF

(71) Applicant: SHIN-ETSU CHEMICAL CO., LTD., Tokyo (JP)

(72) Inventors: Nobuaki Matsumoto, Annaka (JP); Kohei Otake, Annaka (JP); Taichi Kitagawa, Annaka (JP); Tsuyoshi Matsuda, Annaka (JP); Toshiyuki Ozai, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 18/399,857

(22) Filed: Dec. 29, 2023

(65) Prior Publication Data

US 2024/0132648 A1 Apr. 25, 2024
US 2024/0228687 A9 Jul. 11, 2024

Related U.S. Application Data

(63) Continuation of application No. 17/273,450, filed as application No. PCT/JP2019/036044 on Sep. 13, 2019, now abandoned.

(30) Foreign Application Priority Data

Sep. 20, 2018 (JP) ................................. 2018-176159

(51) Int. Cl.
*C08F 2/46* (2006.01)
*C08F 2/50* (2006.01)
*C08F 283/12* (2006.01)
*C08G 61/04* (2006.01)

(52) U.S. Cl.
CPC ............................... *C08F 283/124* (2013.01)

(58) Field of Classification Search
CPC .............. C08F 283/124; C08F 290/068; C08F 220/1811; C08F 222/102; C08L 83/04; C08K 5/04; C08G 77/50; C08G 77/52; C08G 77/38; C08G 77/20; B33Y 70/00
USPC ........... 522/42, 33, 6, 189, 184, 71, 1; 520/1
See application file for complete search history.

(56) References Cited

U.S. PATENT DOCUMENTS

| 4,355,147 | A | 10/1982 | Deichert et al. |
| 9,556,346 | B2 | 1/2017 | Suzuki et al. |
| 9,790,382 | B2 | 10/2017 | Suzuki et al. |
| 11,370,869 | B2 | 6/2022 | Otake et al. |
| 2011/0196096 | A1 | 8/2011 | Angermaier et al. |
| 2015/0280151 | A1* | 10/2015 | Nam ........................ C08L 33/14 |
| | | | 522/64 |
| 2016/0264796 | A1 | 9/2016 | Suzuki et al. |

(Continued)

FOREIGN PATENT DOCUMENTS

| CA | 2 385 069 A1 | 4/2001 |
| CN | 105748179 A | 7/2016 |

(Continued)

OTHER PUBLICATIONS

Chinese Office Action and Search Report for Chinese Application No. 201980060708.7, dated Jun. 22, 2023, with an English translation.

(Continued)

*Primary Examiner* — Jessica Whiteley
(74) *Attorney, Agent, or Firm* — Birch, Stewart, Kolasch & Birch, LLP

(57) ABSTRACT

Provided are a low-viscosity ultraviolet curable silicone composition capable of being used even in a surface exposure method and a lift-up method etc.; and a cured product superior in tensile strength and elongation at break. The ultraviolet curable silicone composition contains:

(A) an organopolysiloxane;
(B) a photopolymerization initiator; and
(C) a monofunctional (meth)acrylate compound having no siloxane structure and/or
(D) a multifunctional (meth)acrylate compound having no siloxane structure, wherein the organopolysiloxane is represented by the following general formula (1):

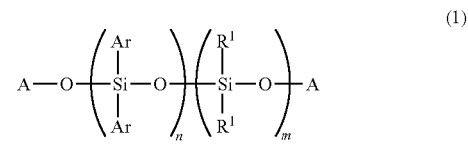

(1)

wherein n satisfies $1 \leq n \leq 1,000$, m satisfies $1 \leq m \leq 1,000$, Ar is an aromatic group, $R^1$ represents a monovalent hydrocarbon group having 1 to 20 carbon atoms, A is a group represented by the following formula (2):

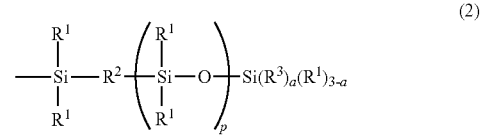

(2)

wherein p satisfies $0 \leq p \leq 10$, a satisfies $1 \leq a \leq 3$, $R^1$ represents a monovalent hydrocarbon group having 1 to 20 carbon atoms, $R^2$ represents an oxygen atom or an alkylene group, $R^3$ represents an acryloyloxyalkyl group or the like.

4 Claims, No Drawings

(56) References Cited

U.S. PATENT DOCUMENTS

| | | | |
|---|---|---|---|
| 2017/0275406 A1* | 9/2017 | Matsumoto | .......... C08K 5/0025 |
| 2019/0233670 A1 | 8/2019 | Matsumoto et al. | |
| 2022/0017790 A1 | 1/2022 | Kitagawa et al. | |

FOREIGN PATENT DOCUMENTS

| | | | |
|---|---|---|---|
| CN | 107216656 A | | 9/2017 |
| EP | 3 222 689 A1 | | 9/2017 |
| EP | 3 943 528 A1 | | 1/2022 |
| JP | 57-209914 A | | 12/1982 |
| JP | 11-287971 A | | 10/1999 |
| JP | 2006-2087 A | | 1/2006 |
| JP | 4788863 B2 | | 10/2011 |
| JP | 2012-111226 A | | 6/2012 |
| JP | 5384656 B2 | | 1/2014 |
| TW | 201819440 A | | 6/2018 |
| WO | WO 2016/134972 A1 | | 9/2016 |
| WO | WO 2018/003381 A1 | | 1/2018 |

OTHER PUBLICATIONS

Extended European Search Report issued May 9, 2022, in European Patent Application No. 19863022.0.

International Search Report (PCT/ISA/210) issued in PCT/JP2019/036044, dated Dec. 10, 2019.

Office Action issued Feb. 8, 2022, in Japanese Patent Application No. 2020-548457.

Office Action issued Jan. 20, 2023, in Chinese Patent Application No. 201980060708.7.

Office Action issued Oct. 25, 2022, in Taiwan Patent Application No. 108133364.

Written Opinion of the International Searching Authority (PCT/ISA/237) issued in PCT/JP2019/036044, dated Dec. 10, 2019.

\* cited by examiner

ULTRAVIOLET CURABLE SILICONE COMPOSITION AND CURED PRODUCT THEREOF

This application is a Continuation of co-pending application Ser. No. 17/273,450, filed on Mar. 4, 2021, which is the National Stage Application under 35 U.S.C. § 371 of International Application No. PCT/JP2019/036044, filed on Sep. 13, 2019, which claims the benefit under 35 U.S.C. § 119(a) to Japanese Patent Application No. 2018-176159, filed on Sep. 20, 2018, all of which are hereby expressly incorporated by reference into the present application.

TECHNICAL FIELD

The present invention relates to an ultraviolet curable silicone composition and a cured product thereof.

BACKGROUND ART

In recent years, molding materials for use in 3D printers are being developed actively, and there exists various kinds of molding materials including metal to resin-based materials. While acrylate photocurable resin compositions and urethane acrylate photocurable resin compositions have been mainly employed in the field of resin, the cured products of these compositions are extremely hard and thus cannot be bent (Patent document 1).

Flexible materials are now required more often depending on intended uses, and materials suitable for various molding methods have already been developed. For example, as a material intended for stereolithography (SLA), there has been developed a composition comprising an alkenyl group-containing organopolysiloxane, a mercapto group-containing organopolysiloxane and a MQ resin (Patent document 2). Further, there is also disclosed a platinum catalyst-containing silicone mixture that is intended for dispensing techniques and is capable of being activated by ultraviolet rays (Patent document 3). Furthermore, there is disclosed a photocurable low-viscosity silicone material intended for 3D printers employing inkjet methods (Patent document 4). However, the problem with such composition is that the cured product thereof is inferior to those of normal silicone materials in heat resistance. There has been a strong desire to develop a material not only applicable to molding methods called surface exposure method and lift-up method which are methods that have seen a rapid increase in numbers in recent years, but also superior in heat resistance.

PATENT DOCUMENTS

Prior Art Documents

Patent document 1: JP-A-2012-111226
Patent document 2: Japanese Patent No. 4788863
Patent document 3: Japanese Patent No. 5384656
Patent document 4: WO2018/003381

SUMMARY OF THE INVENTION

Problems to be Solved by the Invention

The present invention was made in view of the aforementioned circumstances, and it is an object of the present invention to provide a low-viscosity ultraviolet curable silicone composition capable of being used even in a molding method such as a surface exposure method and a lift-up method; and a cured product superior in heat resistance.

Means to Solve the Problems

After diligently conducting a series of studies to achieve the abovementioned object, the present invention was completed as follows. That is, it was found that a low-viscosity ultraviolet curable silicone composition and a cured product thereof with an excellent heat resistance could be provided by employing a particular ultraviolet curable organopolysiloxane component; and a monofunctional ethylene group-containing compound having no siloxane structure and/or a multifunctional ethylene group-containing compound having no siloxane structure.

The present invention is to provide the following ultraviolet curable silicone composition and a cured product thereof.

[1]

An ultraviolet curable silicone composition comprising:
(A) 100 parts by mass of an organopolysiloxane;
(B) 0.1 to 10 parts by mass of a photopolymerization initiator; and
1 to 400 parts by mass of at least one of (C) a monofunctional (meth)acrylate compound having no siloxane structure and (D) a multifunctional (meth)acrylate compound having no siloxane structure, wherein the organopolysiloxane is represented by the following general formula (1):

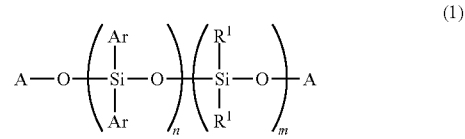

wherein n is a number satisfying $1 \leq n \leq 1{,}000$, m is a number satisfying $1 \leq m \leq 1{,}000$, siloxane units identified by n and m are sequenced in any order, Ar is an aromatic group, each $R^1$ independently represents a monovalent hydrocarbon group having 1 to 20 carbon atoms, A is a group represented by the following formula (2):

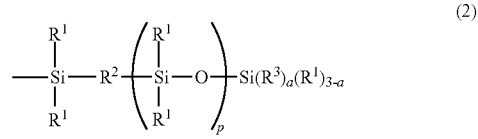

wherein p is a number satisfying $0 \leq p \leq 10$, a is a number satisfying $1 \leq a \leq 3$, each $R^1$ independently represents a monovalent hydrocarbon group having 1 to 20 carbon atoms, $R^2$ represents an oxygen atom or an alkylene group, $R^3$ represents an acryloyloxyalkyl group, a methacryloyloxyalkyl group, an acryloyloxyalkyloxy group or a methacryloyloxyalkyloxy group.

[2]

The ultraviolet curable silicone composition according to [1], wherein $R^1$ in the general formula (1) represents an alkyl group having 1 to 10 carbon atoms.

[3]
The ultraviolet curable silicone composition according to [1] or [2], wherein the ultraviolet curable silicone composition has a viscosity of not higher than 10,000 mPa·s at 25° C.

[4]
A cured product of the ultraviolet curable silicone composition according to any one of [1] to [3].

[5]
The ultraviolet curable silicone composition according to any one of [1] to [3], wherein the ultraviolet curable silicone composition is for use as a 3D printer ink.

Effects of the Invention

Since the ultraviolet curable silicone composition of the present invention has such a low viscosity that it is even capable of being used in a molding method such as a surface exposure method and a lift-up method, the composition is anticipated as a novel molding material for use in 3D printers. Further, since the ultraviolet curable silicone composition of the present invention can be turned into a cured product superior in heat resistance, the composition is also anticipated as a molding material for use in 3D printers employing inkjet methods.

MODE FOR CARRYING OUT THE INVENTION

The present invention is described in greater detail hereunder.
(A) Organopolysiloxane
A component (A) is an organopolysiloxane represented by the following general formula (1).

[Chemical formula 3]

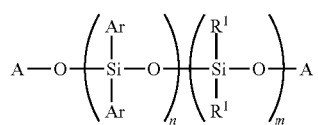

(1)

In the formula (1), examples of an aromatic group represented by Ar include aromatic hydrocarbon groups such as a phenyl group, a biphenyl group and a naphthyl group; and hetero atom (O, S, N)—containing aromatic groups such as a furanyl group. Further, the aromatic group represented by Ar may have a substituent group(s) such as a halogen atom(s) (e.g. chlorine atom, bromine atom, fluorine atom). It is preferred that Ar be an unsubstituted aromatic hydrocarbon group, particularly preferably a phenyl group.

In the formula (1), n satisfies $1 \leq n \leq 1{,}000$, preferably $1 \leq n \leq 500$, more preferably $1 \leq n \leq 400$. When n is smaller than 1, volatilization will take place easily; when n is larger than 1,000, the composition will exhibit a higher viscosity, which will then result in a poor handling property.

In the formula (1), m satisfies $1 \leq m \leq 1{,}000$, preferably $1 \leq m \leq 500$, more preferably $1 \leq m \leq 400$. When m is smaller than 1, volatilization will take place easily; when m is larger than 1,000, the composition will exhibit a higher viscosity, which makes it difficult to perform molding via a lift-up method.

In the formula (1), n+m satisfies $2 \leq n+m \leq 2{,}000$, preferably $2 \leq n+m \leq 1{,}000$, more preferably $2 \leq n+m \leq 800$. When n+m is smaller than 2, volatilization will take place easily; when n+m is larger than 2,000, the composition will exhibit a higher viscosity, which makes it difficult to perform molding via a lift-up method.

In the formula (1), A represents a group expressed by the following formula (2).

[Chemical formula 4]

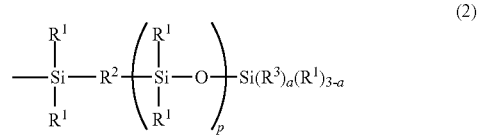

(2)

In the formulae (1) and (2), each $R^1$ independently represents a monovalent hydrocarbon group having 1 to 20 carbon atoms, preferably a monovalent hydrocarbon group having 1 to 10, more preferably 1 to 8 carbon atoms, other than an aliphatic unsaturated group.

In the formulae (1) and (2), the monovalent hydrocarbon group having 1 to 20 carbon atoms, as represented by $R^1$, may be linear, branched or cyclic, specific examples of which include alkyl groups such as a methyl group, an ethyl group, an n-propyl group, an isopropyl group, an n-butyl group, an isobutyl group, a tert-butyl group, an n-hexyl group, a cyclohexyl group, an n-octyl group, a 2-ethylhexyl group and an n-decyl group; alkenyl groups such as a vinyl group, an allyl(2-propenyl) group, a 1-propenyl group, an isopropenyl group and a butenyl group; aryl groups such as a phenyl group, a tolyl group, a xylyl group and a naphthyl group; and aralkyl groups such as a benzyl group, a phenylethyl group and a phenylpropyl group.

Further, part of or all the carbon atom-bonded hydrogen atoms in any of these monovalent hydrocarbon groups may be substituted by other substituent groups; specific examples in such case include halogen-substituted or cyano-substituted hydrocarbon groups such as a chloromethyl group, a bromoethyl group, a trifluoropropyl group and a cyanoethyl group.

Among the above examples, it is preferred that $R^1$ be an alkyl group having 1 to 5 carbon atoms or a phenyl group, more preferably a methyl group, an ethyl group or a phenyl group.

Further, in the formula (2), $R^2$ represents an oxygen atom or an alkylene group having 1 to 20, preferably 1 to 10, more preferably 1 to 5 carbon atoms.

In the formula (2), the alkylene group having 1 to 20 carbon atoms, as represented $R^2$, may be linear, branched or cyclic, specific examples of which include a methylene group, an ethylene group, a propylene group, a trimethylene group, a tetramethylene group, an isobutylene group, a pentamethylene group, a hexamethylene group, a heptamethylene group, an octamethylene group, a nonamethylene group and a decylene group.

Among these examples, it is preferred that $R^2$ be an oxygen atom, a methylene group, an ethylene group or a trimethylene group, more preferably an oxygen atom or an ethylene group.

Further, in the formula (2), each $R^3$ independently represents an acryloyloxyalkyl group, a methacryloyloxyalkyl group, an acryloyloxyalkyloxy group or a methacryloyloxyalkyloxy group.

In the formula (2), there are no particular restrictions on the number of the carbon atoms in the alkyl (alkylene) group(s) in the acryloyloxyalkyl group, methacryloyloxyalkyl group, acryloyloxyalkyloxy group or methacryloyloxyalkyloxy group, as represented by $R^3$. The number of the carbon atoms in such alkyl (alkylene) group(s) is preferably 1 to 10, more preferably 1 to 5. Specific examples of these alkyl groups include those that are listed above as the examples of $R^1$, particularly those having 1 to 10 carbon atoms.

Specific examples of $R^3$ include, but are not limited to those represented by the following formulae.

[Chemical formula 5]

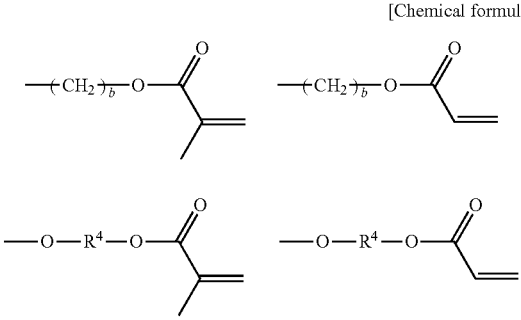

(In the above formulae, b represents a number satisfying $1 \leq b \leq 4$; $R^4$ represents an alkylene group having 1 to 10 carbon atoms.)

In the above formula (2), p represents a number satisfying $0 \leq p \leq 10$, preferably 0 or 1; a represents a number satisfying $1 \leq a \leq 3$, preferably 1 or 2.

As an example(s) of the organopolysiloxane represented by the formula (1), there may be listed the following compounds.

(In the above formulae, $R^1$, $R^2$, $R^4$, Ar, n, m and b are defined as above; siloxane units identified by n and m are sequenced in any order.)

These organopolysiloxanes can be produced by known methods. The organopolysiloxane represented by the formula (3) may, for example, be obtained as a reactant of a hydrosilylation reaction between a both end dimethylvinylsiloxy group-blocked dimethylsiloxane-diphenylsiloxane copolymer and 3-(1,1,3,3-tetramethyldisiloxanyl)propyl methacrylate (CAS No. 96474-12-3).

The organopolysiloxane represented by the formula (4) can be obtained by reacting 2-hydroxyethyl acrylate with a reactant of a hydrosilylation reaction between a both end dimethylvinylsiloxy group-blocked dimethylsiloxane-diphenylsiloxane copolymer and dichloromethylsilane.

(B) Photopolymerization Initiator

As a photopolymerization initiator (B), a known photopolymerization initiator can be used, examples of which include 2,2-diethoxyacetophenone, 2,2-dimethoxy-1,2-diphenylethane-1-one (Irgacure 651 by BASF), 1-hydroxycyclohexyl-phenyl-ketone (Irgacure 184 by BASF), 2-hydroxy-2-methyl-1-phenyl-propane-1-one (Irgacure 1173 by BASF), 2-hydroxy-1-{4-[4-(2-hydroxy-2-methyl-propionyl)-benzyl]-phenyl}-2-methyl-propane-1-one (Irgacure 127 by BASF), phenylglyoxylic acid methyl ester (Irgacure MBF by BASF), 2-methyl-1-[4-(methylthio)phenyl]-2-morpholinopropane-1-one (Irgacure 907 by BASF), 2-benzyl-2-dimethyl amino-1-(4-morpholinophenyl)-1-butanone (Irgacure 369 by BASF), bis(2,4,6-trimethylbenzoyl)-phenylphosphine oxide (Irgacure 819 by BASF), 2,4,6-trimethylbenzoyl-diphenyl-phosphine oxide (Irgacure TPO by BASF) and mixtures of these compounds.-

[Chemical formula 6]

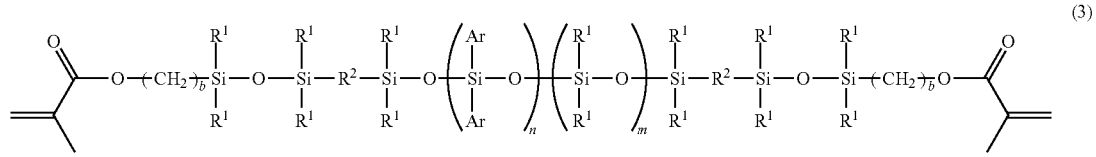

(3)

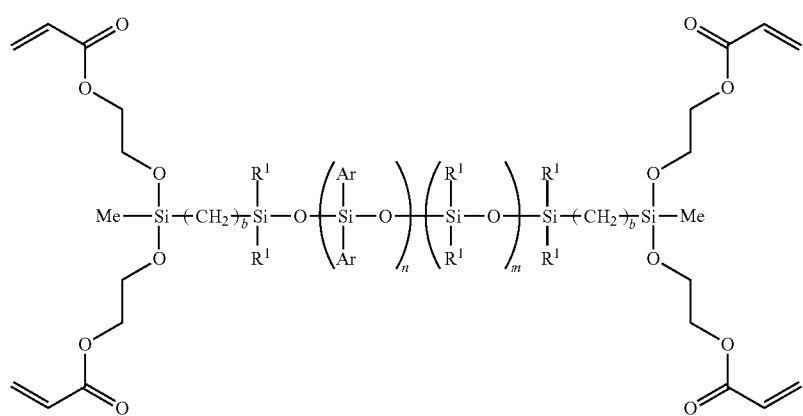

(4)

Among the above examples of the component (B), preferred are 2,2-diethoxyacetophenone, 2-hydroxy-2-methyl-1-phenyl-propane-1-one (Irgacure 1173 by BASF), bis(2,4,6-trimethylbenzoyl)-phenylphosphine oxide (Irgacure 819 by BASF) and 2,4,6-trimethylbenzoyl-diphenyl-phosphine oxide (Irgacure TPO by BASF) in terms of compatibility to the component (A)

The photopolymerization initiator is added in an amount of 0.1 to 10 parts by mass per 100 parts by mass of the component (A). A cured product will exhibit an insufficient curability when the photopolymerization initiator is added in an amount of smaller than 0.1 parts by mass; the cured product will exhibit a poor depth-curability when the photopolymerization initiator is added in an amount of greater than 10 parts by mass.

(C) Monofunctional (Meth)Acrylate Compound Having No Siloxane Structure

Examples of (C) a monofunctional (meth)acrylate compound having no siloxane structure, include isoamyl acrylate, lauryl acrylate, stearyl acrylate, ethoxy-diethylene glycol acrylate, methoxy-triethylene glycol acrylate, 2-ethylhexyl-diglycol acrylate, phenoxyethyl acrylate, phenoxydiethylene glycol acrylate, tetrahydrofurfuryl acrylate, isobornyl acrylate and mixtures of these compounds; isobornyl acrylate is particularly preferred.

(D) Multifunctional (Meth)Acrylate Compound Having No Siloxane Structure

Examples of (D) a multifunctional (meth)acrylate compound having no siloxane structure, include triethyleneglycol diacrylate, polytetramethylene glycol diacrylate, neopentylglycol diacrylate, 1,6-hexanediol diacrylate, dimethylol-tricyclodecane diacrylate, trimethylolpropane triacrylate, pentaerythritol tetraacrylate and mixtures of these compounds; dimethylol-tricyclodecane diacrylate is particularly preferred.

It is preferred that the (meth)acrylate compounds as the components (C) and (D) be contained in a total amount of 1 to 400 parts by mass, more preferably 1 to 200 parts by mass, per 100 parts by mass of the component (A). When the components (C) and (D) are added in a total amount of greater than 400 parts by mass per 100 parts by mass of the component (A), the cured product will exhibit an unnecessarily high hardness, which may make it impossible to achieve desired rubber properties.

Additives such as a silane coupling agent, a polymerization inhibitor, an antioxidant, an ultraviolet absorber as a light-resistant stabilizer, and a light stabilizer may be further added to the composition of the present invention without impairing the effects of the present invention. Further, the composition of the present invention may be appropriately mixed with other resin composition(s) before use.

Method for Producing Silicone Composition

The ultraviolet curable silicone composition of the present invention is obtained by, for example, stirring and mixing the components (A), (B), (C) and/or (D) as well as other components. Although there are no particular restrictions on a device for performing stirring or the like, a planetary mixer and a separable flask may, for example, be used.

In the case of the ultraviolet curable silicone composition of the present invention, as a guide for enabling molding via a lift-up method, it is preferred that the composition have a viscosity of 10 to 10,000 mPa·s, more preferably 100 to 8,000 mPa·s. Here, such viscosity is a value measured at 25° C., using a rotary viscometer.

The ultraviolet curable silicone composition of the present invention cures rapidly when irradiated with ultraviolet rays. As a light source of the ultraviolet rays with which the ultraviolet curable silicone composition of the present invention is to be irradiated, there may be used, for example, a UVLED lamp, a high-pressure mercury lamp, a super high-pressure mercury lamp, a metal halide lamp, a carbon-arc lamp or a xenon lamp. An irradiance level (integrated light quantity) of the ultraviolet rays is such that when, for example, the composition of the present invention has been formed into a sheet having a thickness of about 2.0 mm, the irradiance level is preferably 1 to 10,000 mJ/cm$^2$, more preferably 10 to 5,000 mJ/cm$^2$. That is, when employing an ultraviolet ray of an illuminance of 100 mW/cm$^2$ (365 nm), irradiation may simply be carried out for about 0.01 to 100 sec using such ultraviolet ray.

Further, in order for the cured product of the ultraviolet curable silicone composition of the present invention to exhibit superior rubber properties, a hardness after curing is in a range of 5 to 80 (Type A), preferably a range of 10 to 70 (Type A). It is preferred that a tensile strength after curing be not lower than 0.6 MPa, more preferably not lower than 0.8 MPa. It is preferred that an elongation at break after curing be not lower than 40%, more preferably not lower than 50%. Here, these values are measured in accordance with JIS-K6249. The rubber properties of the cured product can be adjusted by increasing or decreasing the amount of the components (C) and (D) added.

WORKING EXAMPLES

The present invention is described in detail hereunder with reference to working and comparative examples. However, the present invention is not limited to the following working examples.

Working Examples 1 to 4; Comparative Example 1

An ultraviolet curable silicone composition was obtained by mixing the following components at the compounding ratios shown in Table 1 (values represent parts by mass).

Here, the viscosity of the composition obtained in each example is a value measured by a rotary viscometer at 25° C.

Further, each composition was poured into a frame, followed by using a lamp, H(M) 06-L-61 manufactured by EYE GRAPHICS Co., Ltd. to cure the composition under a nitrogen atmosphere and an ultraviolet ray irradiation condition of 2,000 mJ/cm$^2$, thereby obtaining a cured sheet each having a thickness of 2.0 mm. As for each cured sheet, a hardness, a tensile strength and an elongation at break thereof before and after a heat resistance test (left at 200° C. for 20 hours) were measured in accordance with JIS-K6249, and the measurement results are shown in Table 1.

Component (A)

(A-1): Organopolysiloxane produced by the abovementioned method and represented by the following formula (5)

[Chemical formula 7]

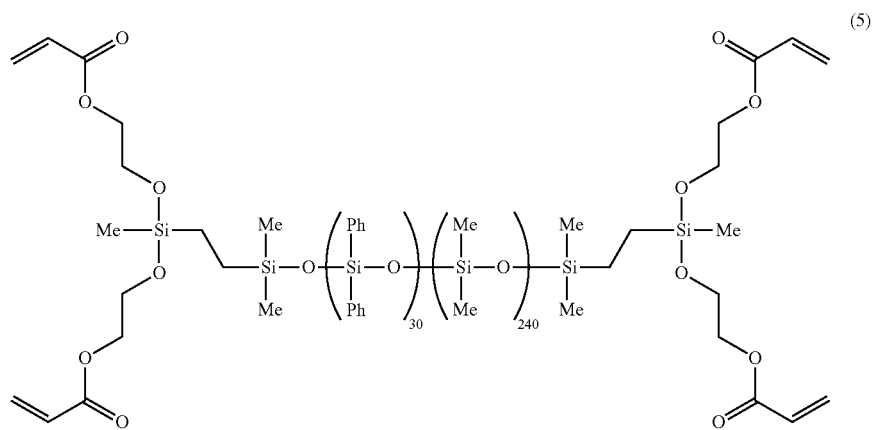

(In this formula, siloxane units expressed with parentheses are sequenced in any order.)

(A-2): Organopolysiloxane produced by the abovementioned method and represented by the following formula (6)

[Chemical formula 8]

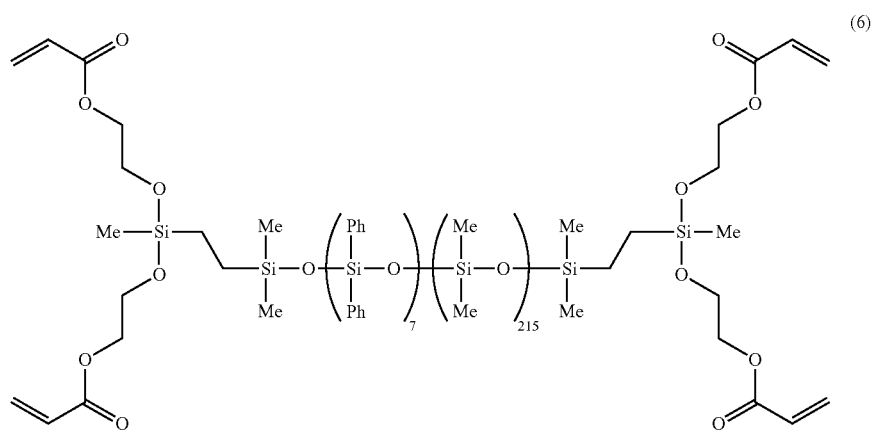

(In this formula, siloxane units expressed with parentheses are sequenced in any order.)

Comparative Component (A-3): Organopolysiloxane represented by the following formula (7)

[Chemical formula 9]

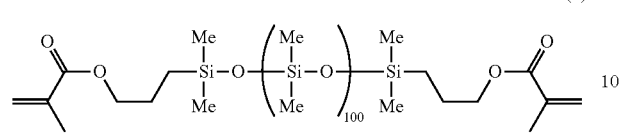

(A-4): Organopolysiloxane represented by the following formula (8)

[Chemical formula 10]

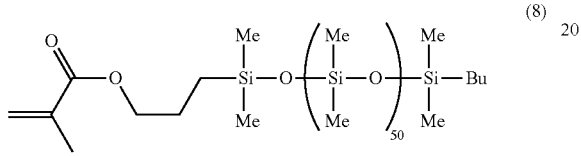

Component (B)
 (B-1): 2-hydroxy-2-methyl-1-phenyl-propane-1-one (Irgacure 1173 by BASF)
 (B-2): 2,4,6-trimethylbenzoyl-diphenyl-phosphine oxide (Irgacure TPO by BASF)
Component (C)
 Isobornyl acrylate (Light acrylate IB-XA by Kyoeisha Chemical Co., Ltd.)
Component (D)
 Dimethylol-tricyclodecane diacrylate (Light acrylate DCP-A by Kyoeisha Chemical Co., Ltd.)

TABLE 1

|  | Working example 1 | Working example 2 | Working example 3 | Working example 4 | Comparative example 1 |
|---|---|---|---|---|---|
| (A-1) | 100 | 100 | — | — | — |
| (A-2) | — | — | 100 | 100 | — |
| (A-3) | — | — | — | — | 100 |
| (A-4) | — | — | — | — | 75 |
| (B-1) | 1.5 | 1.1 | 0.6 | 0.7 | 4.0 |
| (B-2) | 1.5 | 1.1 | 0.6 | 0.7 | 4.0 |
| (C) | 45 | — | 25 | 45 | 75 |
| (D) | — | 10 | — | — | — |
| Composition viscosity (mPa · s) | 780 | 2870 | 530 | 360 | 60 |
| Initial hardness (Type A) | 29 | 41 | 30 | 54 | 25 |
| Initial tensile strength (MPa) | 2.3 | 0.9 | 1.8 | 6.2 | 1.2 |
| Initial elongation at break (%) | 240 | 66 | 180 | 250 | 170 |
| Hardness after heat resistance test (Type A) | 31 | 45 | 34 | 58 | 30 |
| Tensile strength after heat resistance test (MPa) | 2.2 | 1.0 | 2.1 | 4.6 | 0.4 |
| Elongation at break after heat resistance test (%) | 200 | 50 | 150 | 190 | 30 |

As shown in Table 1, the ultraviolet curable silicone composition of the present invention has a sufficiently low viscosity, exhibits excellent rubber properties and heat resistance after curing, and is particularly useful as a silicone material intended for 3D printers employing molding methods such as a surface exposure method and a lift-up method. In contrast, a cured sheet obtained in a comparative example 1 in which the component (A) was not used was inferior in rubber properties after heat resistance test.

The invention claimed is:

1. A method for producing a molding material by inkjet methods using 3D printers, comprising:

ejecting an ultraviolet curable silicone composition via ink-jet ejection using the ink-jet 3D printer to produce the molding material, wherein an ultraviolet curable silicone composition is used as a 3D printer ink, the ultraviolet curable silicone composition comprising:

(A) 100 parts by mass of an organopolysiloxane;

(B) 0.1 to 10 parts by mass of a photopolymerization initiator; and 1 to 400 parts by mass of at least one of (C) a monofunctional (meth)acrylate compound having no siloxane structure and (D) a multifunctional (meth)acrylate compound having no siloxane structure, wherein the organopolysiloxane is represented by the following general formula (1):

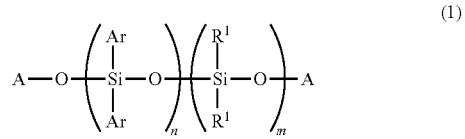

wherein n is a number satisfying $1 \leq n \leq 1{,}000$, m is a number satisfying $1 \leq m \leq 1{,}000$, siloxane units identified by n and m are sequenced in any order, Ar is an aromatic group, each $R^1$ independently represents a monovalent hydrocarbon group having 1 to 20 carbon atoms, A is a group represented by the following formula (2):

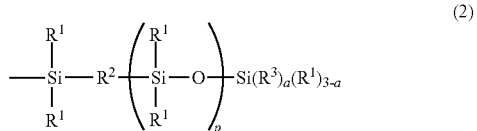

wherein p is a number satisfying 0≤p≤10, a is a number satisfying 1≤a≤3, each $R^1$ independently represents an alkyl group having 1 to 10 carbon atoms, $R^2$ represents an oxygen atom or an alkylene group, $R^3$ represents an acryloyloxyalkyl group, a methacryloyloxyalkyl group, an acryloyloxyalkyloxy group or a methacryloyloxyalkyloxy group.

2. The method for producing a molding material according to claim 1, wherein the ultraviolet curable silicone composition has a viscosity of not higher than 10,000 mPa·s at 25° C.

3. A method for forming a molded product from an ultraviolet curable silicone composition by inkjet methods using ink-jet 3D printers, comprising:
ejecting the ultraviolet curable silicone composition via ink-jet ejection using the ink-jet 3D printer to produce the molded product,
wherein the ultraviolet curable silicone composition is used as a 3D printer ink, the ultraviolet curable silicone composition comprising:
(A) 100 parts by mass of an organopolysiloxane;
(B) 0.1 to 10 parts by mass of a photopolymerization initiator; and
1 to 400 parts by mass of at least one of (C) a monofunctional (meth)acrylate compound having no siloxane structure and (D) a multifunctional (meth)acrylate compound having no siloxane structure, wherein the organopolysiloxane is represented by the following general formula (1):

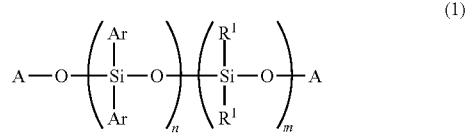

wherein n is a number satisfying 1≤n≤1,000, m is a number satisfying 1≤m≤1,000, siloxane units identified by n and m are sequenced in any order, Ar is an aromatic group, each $R^1$ independently represents a monovalent hydrocarbon group having 1 to 20 carbon atoms, A is a group represented by the following formula (2):

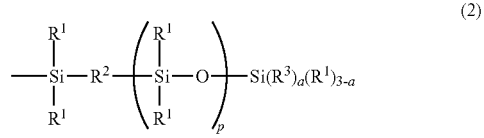

wherein p is a number satisfying 0≤p≤10, a is a number satisfying 1≤a≤3, each $R^1$ independently represents an alkyl group having 1 to 10 carbon atoms, $R^2$ represents an oxygen atom or an alkylene group, $R^3$ represents an acryloyloxyalkyl group, a methacryloyloxyalkyl group, an acryloyloxyalkyloxy group or a methacryloyloxyalkyloxy group.

4. A method for applying an ultraviolet curable silicone composition to form a molded product by inkjet methods using ink-jet 3D printers, comprising:
ejecting the ultraviolet curable silicone composition via ink-jet ejection using the ink-jet 3D printer to produce the molded product,
wherein the ultraviolet curable silicone composition is used as a 3D printer ink, the ultraviolet curable silicone composition comprising:
(A) 100 parts by mass of an organopolysiloxane;
(B) 0.1 to 10 parts by mass of a photopolymerization initiator; and
1 to 400 parts by mass of at least one of (C) a monofunctional (meth)acrylate compound having no siloxane structure and (D) a multifunctional (meth)acrylate compound having no siloxane structure, wherein the organopolysiloxane is represented by the following general formula (1):

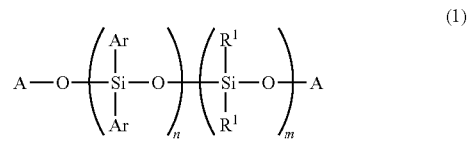

wherein n is a number satisfying 1≤n≤1,000, m is a number satisfying 1≤m≤1,000, siloxane units identified by n and m are sequenced in any order, Ar is an aromatic group, each $R^1$ independently represents a monovalent hydrocarbon group having 1 to 20 carbon atoms, A is a group represented by the following formula (2):

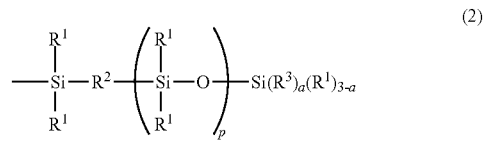

wherein p is a number satisfying 0≤p≤10, a is a number satisfying 1≤a≤3, each $R^1$ independently represents an alkyl group having 1 to 10 carbon atoms, $R^2$ represents an oxygen atom or an alkylene group, $R^3$ represents an acryloyloxyalkyl group, a methacryloyloxyalkyl group, an acryloyloxyalkyloxy group or a methacryloyloxyalkyloxy group.

* * * * *